US009886356B2

(12) United States Patent
Du et al.

(10) Patent No.: US 9,886,356 B2
(45) Date of Patent: *Feb. 6, 2018

(54) DYNAMICALLY ADJUSTING POWER DISTURBANCE HOLD UP TIMES

(71) Applicant: INTERNATIONAL BUSINESS MACHINES CORPORATION, Armonk, NY (US)

(72) Inventors: Mann Du, Palo Alto, CA (US); Ya-Huey Juan, San Jose, CA (US); Larry Juarez, Tucson, AZ (US); Brian C. Kraemer, Elk Grove, CA (US); Ronald D. Martens, Benson, AZ (US); Su Qin, Shanghai (CN); Todd C. Sorenson, Tucson, AZ (US); Ji Qiu Xu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/147,380

(22) Filed: May 5, 2016

(65) Prior Publication Data

US 2016/0246693 A1   Aug. 25, 2016

(51) Int. Cl.
*G06F 1/30* (2006.01)
*G06F 11/20* (2006.01)
*G06F 1/28* (2006.01)
*H02J 9/00* (2006.01)
*H02J 9/06* (2006.01)
*H02J 7/00* (2006.01)

(52) U.S. Cl.
CPC ............ *G06F 11/2015* (2013.01); *G06F 1/28* (2013.01); *G06F 1/30* (2013.01); *H02J 7/0052* (2013.01); *H02J 9/00* (2013.01); *H02J 9/061* (2013.01); *G06F 2201/805* (2013.01)

(58) Field of Classification Search
None
See application file for complete search history.

(56) References Cited

U.S. PATENT DOCUMENTS 5,117,324 A    5/1992   Johnson, Jr.
7,157,886 B2   1/2007   Agarwal et al.
(Continued)

OTHER PUBLICATIONS

Anonymous, "Design for Testability: A Method to Integrate/Simulate EPOW in System Functional Stress in Order to Determine System Behavior Due to Power Line, Disturbance for Early Fail Detection and Test," An IP.com Prior Art Database Technical Disclosure, IPCOM000216950D, Apr. 25, 2012 (3 pages).

(Continued)

*Primary Examiner* — Paul Yanchus, III
(74) *Attorney, Agent, or Firm* — Griffiths & Seaton PLLC (57) ABSTRACT

Power line disturbance hold up times are dynamically adjusted based on battery capacity of a plurality of batteries in a plurality of racks by determining which one of the plurality of racks has a fewest number of remaining batteries of the plurality of batteries having the battery capacity. A determination of an amount of the power line disturbance the one of the plurality of racks, having the fewest number of remaining batteries of the plurality of batteries with the battery capacity, is able to support.

17 Claims, 9 Drawing Sheets

(56) References Cited

U.S. PATENT DOCUMENTS

| | | |
|---|---|---|
| 7,275,182 B2 | 9/2007 | Egan et al. |
| 7,747,900 B2 | 6/2010 | Elliott et al. |
| 7,937,602 B2 | 5/2011 | Elliott et al. |
| 7,982,339 B2 | 7/2011 | Yeh et al. |
| 8,533,514 B2 | 9/2013 | Rogers et al. |
| 8,952,566 B2 | 2/2015 | Harris et al. |
| 9,348,390 B2 * | 5/2016 | Du .......................... H02J 9/061 |
| 2006/0133181 A1 | 6/2006 | Amano |
| 2009/0189451 A1 | 7/2009 | Roepke |
| 2011/0304211 A1 | 12/2011 | Peterson et al. |
| 2012/0098342 A1 | 4/2012 | Johnson, Jr. |
| 2012/0169141 A1 | 7/2012 | Divan |
| 2012/0313437 A1 | 12/2012 | Latham |
| 2012/0313438 A1 | 12/2012 | Klikic et al. |
| 2013/0030735 A1 | 1/2013 | Jau et al. |

OTHER PUBLICATIONS

Chiste et al., "NetRiver Selects Energy Efficient, Scalable, Compact UPS and Power Xpert Monitoring," Gartner Datacenter Conference, Las Vegas, NV, Dec. 2, 2008 (24 pages).

* cited by examiner

DYNAMICALLY ADJUSTING POWER DISTURBANCE HOLD UP TIMES

CROSS REFERENCE TO RELATED APPLICATIONS

This application is a Continuation of U.S. patent application Ser. No. 13/886,489, filed on May 3, 2013.

BACKGROUND OF THE INVENTION

Field of the Invention

The present invention relates in general to computers, and more particularly to dynamically adjusting power disturbance hold up times in a storage system having a direct current (DC) uninterruptible power supply (UPS) in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. These computing system requiring a continuous power supply for performance. In some storage systems, an uninterruptible power supply (UPS), also known as an uninterruptible power source, uninterruptible power system, continuous power supply (CPS), or a battery backup is a device is included which maintains a continuous supply of electrical power to connected equipment by supplying power from a separate source when utility power is not available. A UPS differs from an auxiliary power supply or standby generator, which generally does not provide instant protection from a momentary power interruption.

SUMMARY OF THE DESCRIBED EMBODIMENTS

In one embodiment, a method is provided for dynamically adjusting power disturbance hold up times in a storage system having a direct current (DC) uninterruptible power supply (UPS) by a processor device in a computing environment. In one embodiment, by way of example only, power line disturbance hold up times are dynamically adjusted based on battery capacity of a plurality of batteries in a plurality of racks by determining which one of the plurality of racks has a fewest number of remaining batteries of the plurality of batteries having the battery capacity. A determination of an amount of the power line disturbance the one of the plurality of racks, having the fewest number of remaining batteries of the plurality of batteries with the battery capacity, is able to support.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As mentioned above, an uninterruptible power supply (UPS), also known as an uninterruptible power source, uninterruptible power system, continuous power supply (CPS), or a battery backup is a device which maintains a continuous supply of electrical power to connected equipment by supplying power from a separate source when utility power is not available. A UPS differs from an auxiliary power supply or standby generator, which generally does not provide instant protection from a momentary power interruption.

While not limited to safeguarding any particular type of equipment, a UPS protects computers, telecommunications equipment, and/or other electrical equipment where an unexpected power disruption could cause injuries, business disruption, or data loss. UPS units range in size from units that will back up a single computer to units that will power entire data centers or buildings.

The single phase AC electrical power available in computer or information technology (IT) centers is often classified as either low voltage or high voltage. The low voltage range is traditionally 90 to 132VAC. The high voltage range is traditionally 180 to 264VAC.

In high end storage systems, surviving and reducing power line disturbances is critical to system availability. In one embodiment, in a direct current uninterruptible power supply (DC UPS) system the number of batteries in the system determines how long the system power line disturbance hold up time may be. Thus as batteries are added to the system, or as batteries fail, the time the DC UPS can hold up the system changes as well. Failure to have the correct power line disturbance hold up time value at any given time will result in either data loss and/or data access loss. In the case that the extended power line disturbance (ePLD) value is left too high, the power controller has the batteries hold up the system too long before starting the modified data dump and then the batteries don't have enough capacity to dump the data to non-volatile storage thus causing data loss. In the case where the hold up time is left too low, an un-warranted access loss may occur as the system starts the modified data dump too soon when the system actually had a enough capacity to continue to hold up the system (e.g. the hold up time is set up to 5 seconds but actually have battery capacity to hold up 50 seconds).

In one embodiment, the power line disturbance hold up time is controlled by the power controller, which communicates with the UPS System. When the UPS system indicates that a rack in a storage system is running on battery power, then the power control starts a countdown of the power line disturbance hold up time before notifying the system to dump the modified customer data and shutdown. For instance, if the power line disturbance hold up time register in the power controller was set to 15 seconds then the controller would wait 15 seconds before starting the system shutdown. If power is restored before the 15 second timer expires then no shutdown is performed. In one embodiment, the present invention would set the value statically and/or dynamically based on how many batteries are installed in the system at manufacturing time. As batteries fail/replaced the ePLD hold up time is not changed.

However, as batteries fail, are added, are removed, and/or are replaced into a system, the present invention may set the correct power line disturbance hold up time value accordingly. Thus, in one embodiment, the present invention provides a solution that dynamically adjusts the power line disturbance hold up time based on how much battery capacity is in the system. The main advantage of this is the power line disturbance value is always set based on how much battery capacity the system currently has rather than the number of batteries, thus avoiding data loss or loss of data access when a power line disturbance occurs.

In one embodiment, by way of example only, the present invention provides an algorithm to dynamically adjust the power disturbance failover hold up time before beginning the power line disturbance failover based on a current status of the batteries in the racks of the system after monitoring a failure or addition of batteries. In the algorithm, even if a rack in the system has dropped one of the duplicate UPS elements, the power line disturbance hold up time is based on the number remaining good batteries (e.g., batteries having a charge) in the surviving UPS element, and selects the system power line disturbance hold up time based on the rack with a shortest power line disturbance hold up time. In one embodiment, the UPSx are redundant power systems within each rack and the battery capacity for each rack is calculated by the maximum number of good batteries from any surviving UPS inside the rack (e.g., if Rack-A of UPS0 has only 2 good batteries but UPS1 has 3 good batteries, then Rack-A is still considered to have 3 battery capacity.)

In one embodiment, the present invention provides an algorithm to dynamically change power line disturbance hold up times based on battery capacity and enables the system to set the correct power line disturbance hold up time value accordingly as batteries are added, removed, fail, and/or are replaced into a system. The present invention provides an advantage in that the power line disturbance hold up time value is always set based on how much battery capacity the system currently has and thus avoiding data loss or loss of access when a power line disturbance occurs.

In one embodiment, the present invention provides an algorithm to dynamically change power line disturbance hold up times based on battery capacity in a high end multi-rack storage system having at least one uninterruptible power supply (UPS), a battery service module (BSM), an extended power line disturbance (ePLD). The present invention also provides a procedure showing how the system dynamically changes the ePLD value when a UPS or battery failure occurs, and a procedure showing how the power line disturbance hold up time is dynamically updated when a UPS or BSM set is repaired and comes back available, and a procedure showing how the system sets a new ePLD hold up time value based on a configuration value. The present invention dynamically updates the new power line disturbance hold up time in the power controller when new batteries are installed to UPS on each rack shown in this disclosure.

Figure 1:
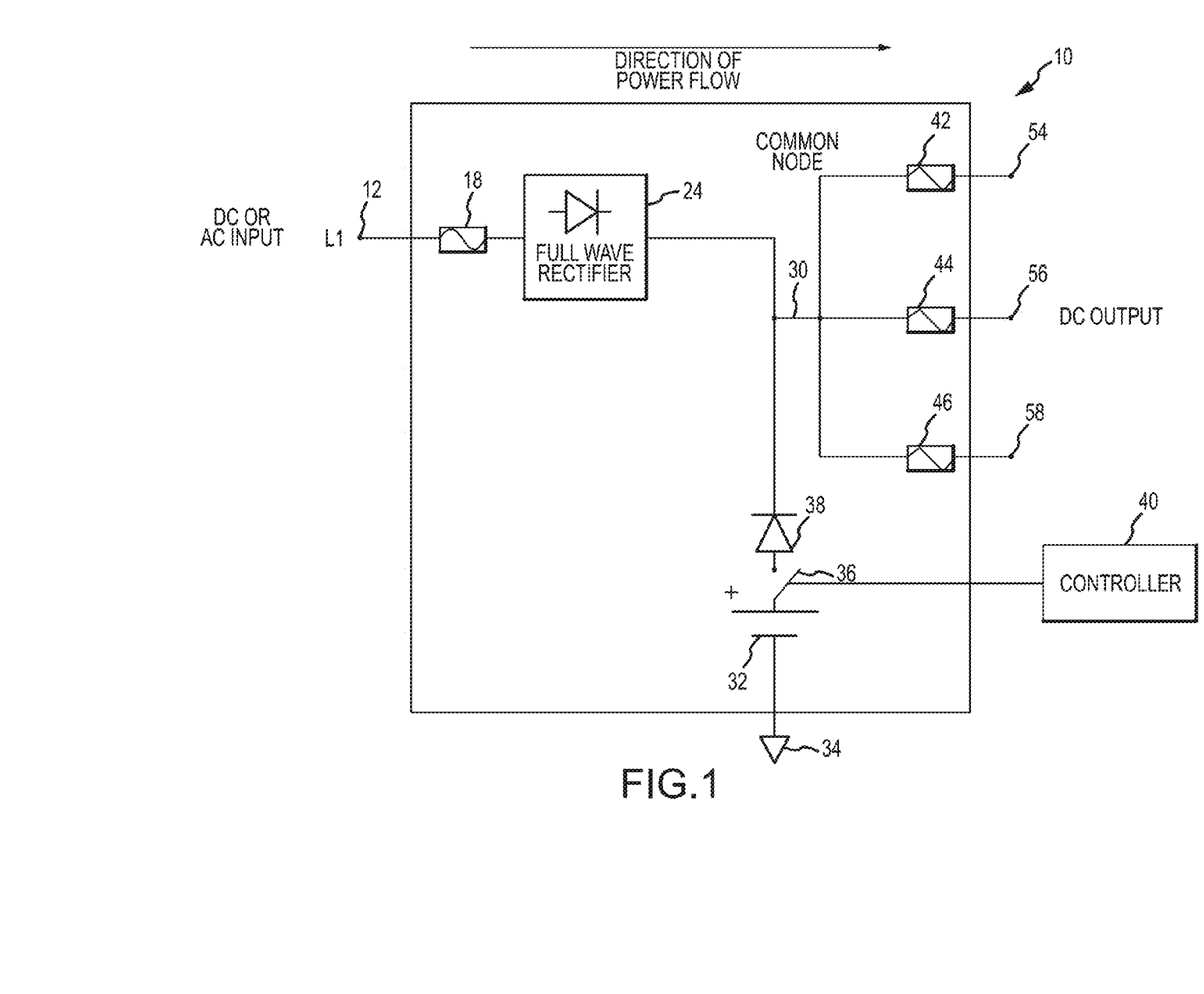
FIG. 1 is a schematic diagram of an exemplary direct current uninterruptible power supply (DC UPS)

FIG. 1 is a schematic diagram of an exemplary direct current uninterruptible power supply (DC UPS). Turning to FIG. 1, an exemplary DC UPS 10 is illustrated in which aspects of the present invention may be implemented. It should be appreciated, however, that FIG. 1 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

DC UPS 10 includes at least one input 12. The input 12 may accept DC or rectified AC power. The input 12 is connected to circuit protection device 18. Circuit protection device 18 may, as one skilled in the art will anticipate, vary for a particular implementation. For example, circuit protection device 18 may include fuses, fuse elements, fusible links, circuit breakers, and the like as the skilled artisan will expect.

Circuit protection device 18 is connected to a rectifier. In the depicted embodiment, full wave rectifier 24 is shown connected to circuit protection device 18. The full wave rectifier 24 is connected to a common node 30. In other embodiments, however, the rectifier 24 may be a half wave rectifier 24.

A battery 32 supplies backup current in the event of a power disruption. Battery 32 is connected between ground 34 and a disconnect switch 36. Disconnect switch 38 is in turn connected to a blocking diode 38. Disconnect switch 38 may be actuated by a controller 40. For example, disconnect switch 38 may be a relay or a similar device. Controller 40 may provide a control signal to the disconnect switch 38 upon a detection of a power disruption from one or more of the inputs 12. As one skilled in the art will expect, disconnect switch 38 may include transistor devices, such as metal oxide semiconductor field effect transistors (MOSFETs).

Circuit protection device 42 is shown connected to the common node 30, and corresponds to one of three DC outputs 54, 56 and 58. DC outputs 54, 56, and 58 are adapted for connection to at least one electrical load. The connected load(s) are shared between the outputs 54, 56, and 58. Circuit protection devices 42, 44, and 46 may again include fuse and circuit breaker devices as previously described to isolate load faults.

DC UPS 10 rectifies input current through input 12. In cases of more than one input 12, each having an input current, the outputs of each of the rectified currents are combined at common node 30.

To implement DC UPS 10 in an embodiment that provides auto-ranging backup voltage capability, a battery backup circuit may be substituted for the battery 32 as shown in FIG. 1.

Figure 2:
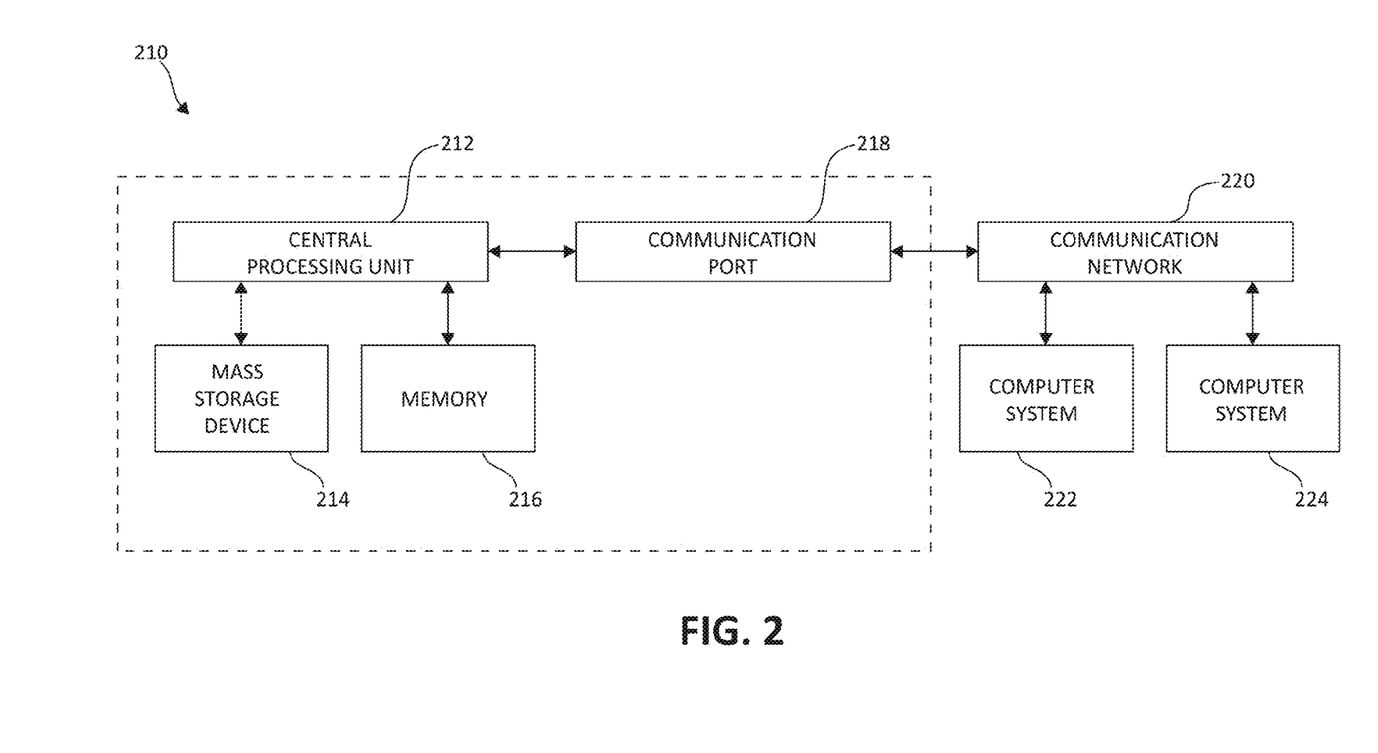
FIG. 2 is a block diagram illustrating a computing system environment having an example storage device in which aspects of the present invention may be realized.

Turning now to FIG. 2, exemplary architecture 210 of a computing system environment is depicted. The computer system 210 includes central processing unit (CPU) 212, which is connected to communication port 218 and memory device 216. The communication port 218 is in communication with a communication network 220. The communication network 220 and storage network may be configured to be in communication with server (hosts) 224 and storage systems, which may include storage devices 214. The storage systems may include hard disk drive (HDD) devices, solid-state devices (SSD) etc., which may be configured in a redundant array of independent disks (RAID). The operations as described below may be executed on storage device(s) 214, located in system 210 or elsewhere and may have multiple memory devices 216 working independently and/or in conjunction with other CPU devices 212. Memory device 216 may include such memory as electrically erasable programmable read only memory (EEPROM) or a host of related devices. Memory device 216 and storage devices 214 are connected to CPU 212 via a signal-bearing medium. In addition, CPU 212 is connected through communication port 218 to a communication network 220, having an attached plurality of additional computer host systems 224. In addition, memory device 216 and the CPU 212 may be embedded and included in each component of the computing system 210. Each storage system may also include separate and/or distinct memory devices 216 and CPU 212 that work in conjunction or as a separate memory device 216 and/or CPU 212.

Figure 3:
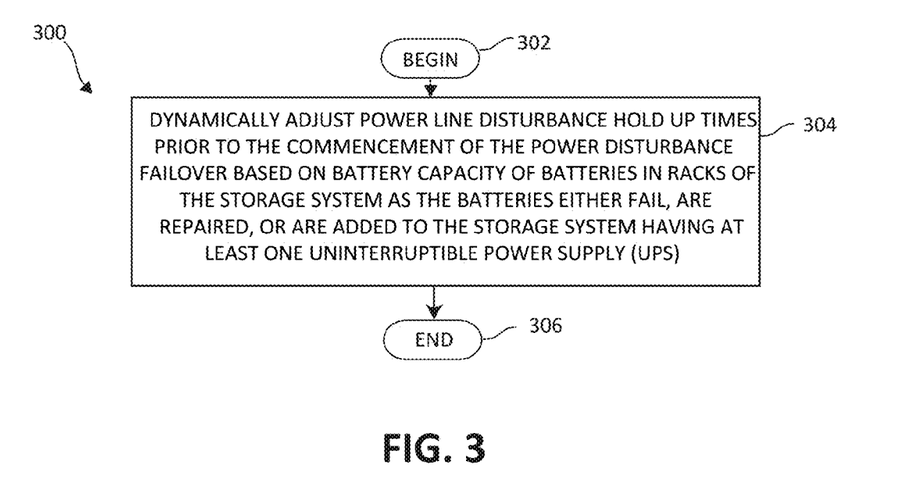
FIG. 3 is a flowchart illustrating an exemplary method for dynamically adjusting power disturbance hold up times in a storage system having a direct current (DC) uninterruptible power supply (UPS) in which aspects of the present invention may be realized.

FIG. 3 is a flowchart illustrating an exemplary method 300 for dynamically adjusting power line disturbance hold up times in a storage system having a direct current (DC) uninterruptible power supply (UPS) in which aspects of the present invention may be realized. The method 300 begins (step 302). The method 300 dynamically adjusts power line disturbance hold up times prior to the commencement of the power line disturbance failover based on battery capacity of batteries in racks of the storage system as the batteries either fail, are repaired, and/or are added to the storage system having at least one uninterruptible power supply (UPS) (step 304). The method 300 ends (step 306).

Figure 4:
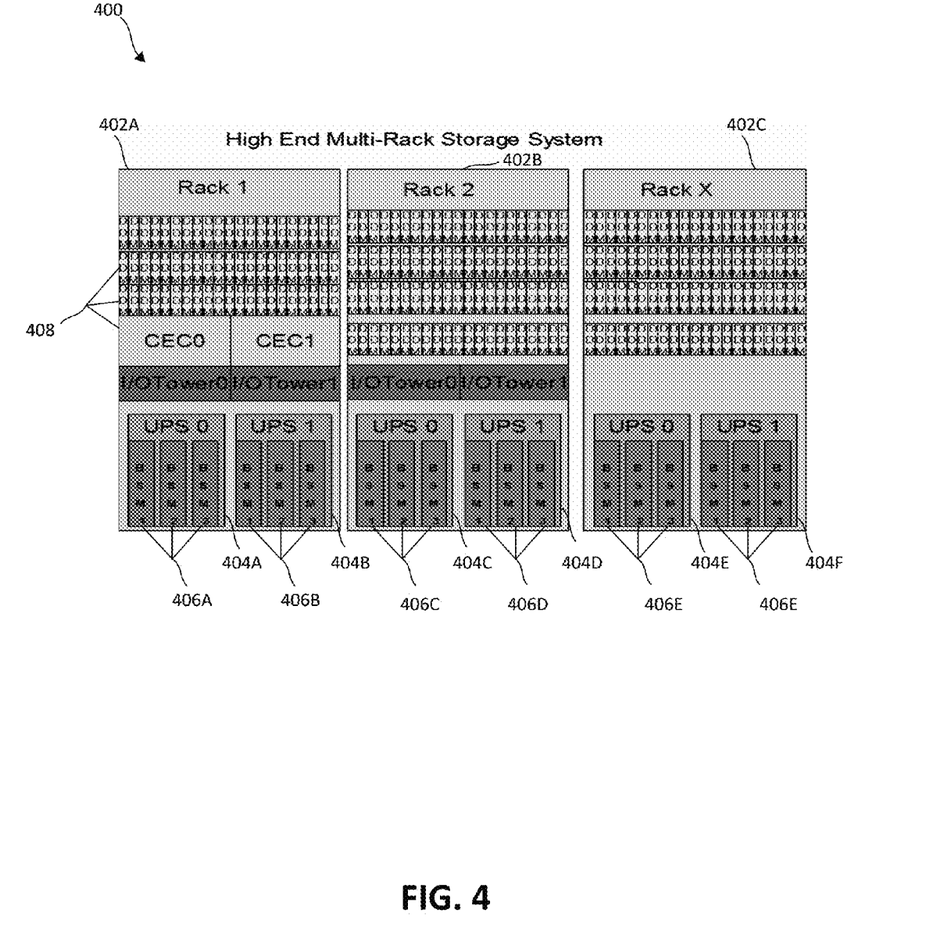
FIG. 4 is a block diagram illustrating a high end multi-rack storage system in which aspects of the present invention may be realized.

FIG. 4 is a block diagram illustrating a high end multi-rack storage system 400 in in which aspects of the present invention may be realized. In one embodiment, a high end multi-rack storage system 400 includes at least one direct current (DC) uninterruptible power supply (UPS) 406 (shown as 406A-E) in each rack 402A-C. In each UPS 406A-E, a battery service module (BSM) 404 (shown in FIG. 4 as 404A-F) is included in each in each rack 402A-C. Each DC UPS 406A-E has 1 to 3 BSM Sets 404A-F depending on how much power line disturbance hold up time a user desires to have (the BSM sets may be more than 3 and is shown by way of example only). For example, consider the following scenario. One BSM set 404 per DC UPS 406 equals 5 second power line disturbance hold up times. A second BSM Set 404 per DC UPS 406 equals 50 second power line disturbance hold up times. A third or nth BSM Set 404 per DC UPS 406 equals 240 second power line disturbance hold up times. Assume the system has 3 BSM Sets 404 in each UPS 406 for a power line disturbance hold up time of 240 seconds. Also, one or more various types of server 408 may be included and shown in FIG. 4, by way of example only, with disk drive module "DDM" (e.g., hard drives) and coraid ethernet console (CEC) servers. Now, focusing on one of the racks 402, the scenario is now experiencing a power line disturbance hold up time failure as depicted in FIG. 5.

Figure 5:
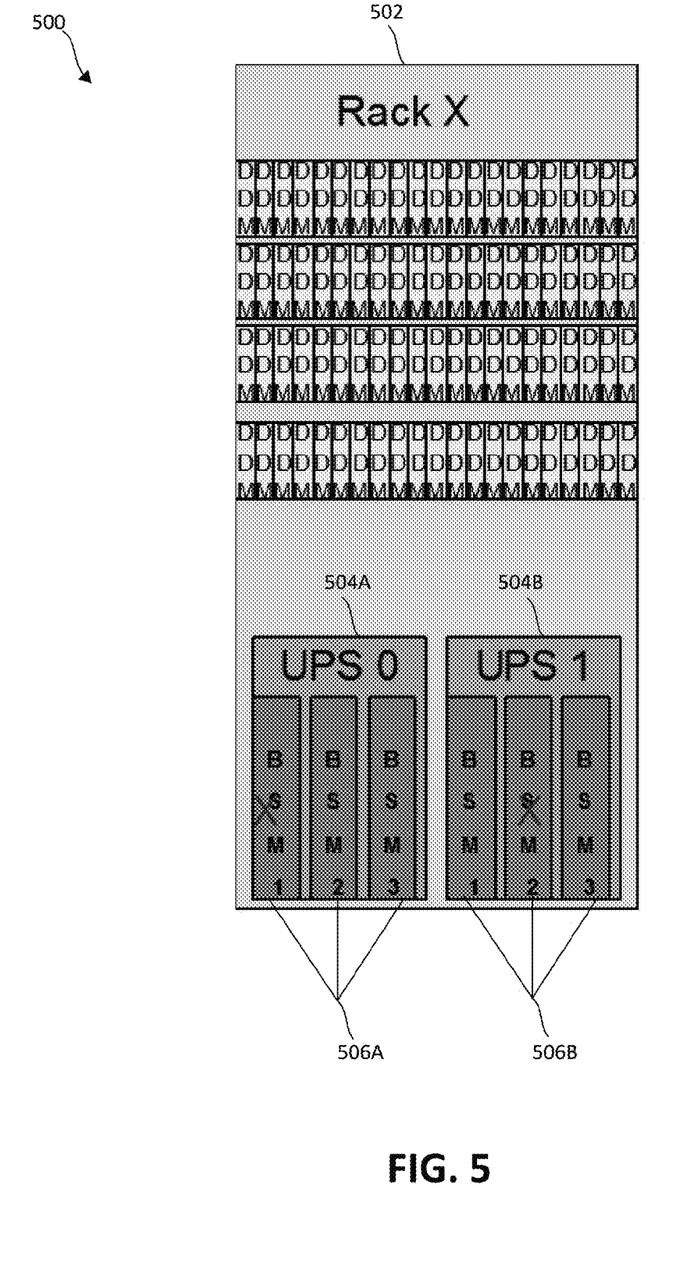
FIG. 5 is a block diagram illustrating a power disturbance failover in a high-end rack of a storage system in which aspects of the present invention may be realized.

Turning now to FIG. 5, a block diagram illustrating a power disturbance failover in a high-end rack of a storage system 500, the following failure scenario is depicted. For example, in the power line disturbance hold up time failure scenario, where the a rack 502 in the system 500 no long has enough good batteries 506 (e.g., charged batteries) of the battery service module (BSM) 506 (shown as 506A-B in FIG. 5), which is indicated with an "X" labeled on the bad batteries (BSM 1 and BSM 2) of the BSMs 506A-B (e.g., insufficient charge) having an insufficient charge to hold the system 500 up for 240 seconds. The rack 502 has had a battery fail in each DC UPS 504A-B. As such, this rack 502 can now only support 50 second power line disturbance hold up time, based on the example scenario of FIG. 4 and FIG. 5. Also, one or more various types of servers may be included in the rack may be included (see similar features in FIG. 4, by way of example only, with disk drive module "DDM" (e.g., hard drives) and coraid ethernet console (CEC) servers).

Figure 6:
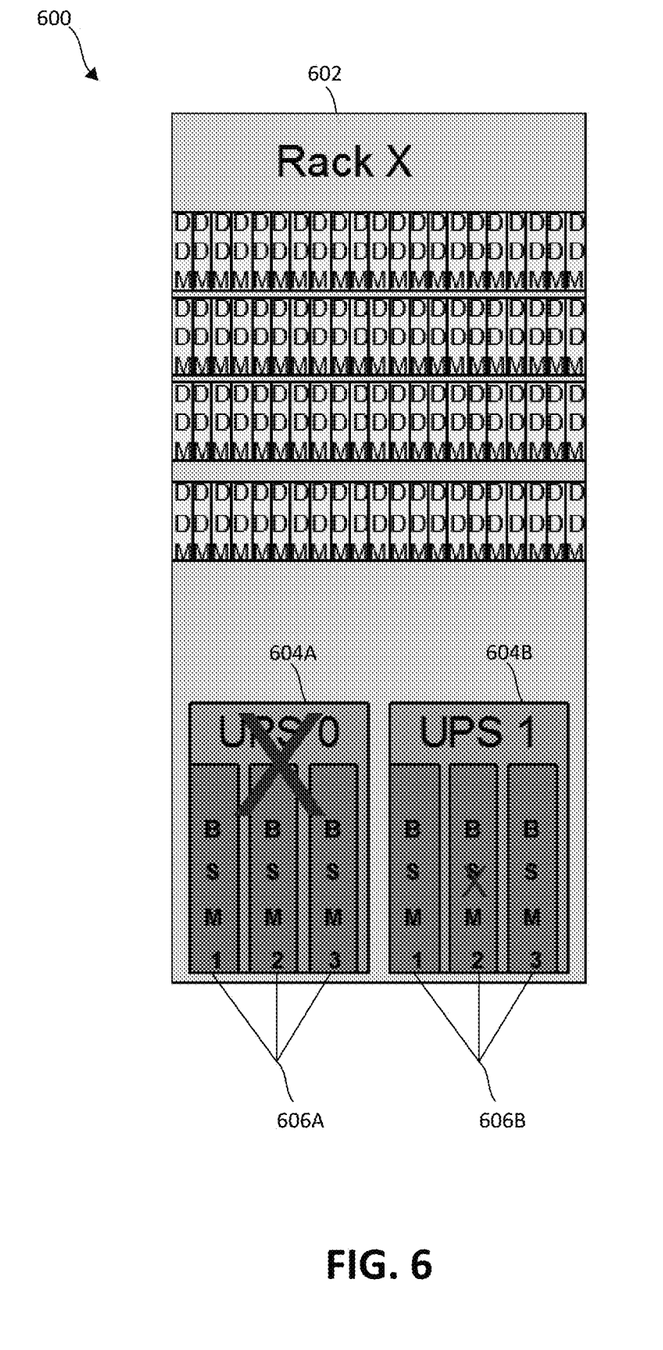
FIG. 6 is a block diagram illustrating an alternative power disturbance failover in a high end rack of a storage system in which aspects of the present invention may be realized.

Continuing on with the scenario's from FIG. 4-5, a third and/or an nth rack may also experience a power disturbance failover, as depicted in FIG. 6. Turning now to FIG. 6, a block diagram illustrating an alternative power disturbance failover in an nth high-end rack of a storage system 600, the following failure scenario is depicted. As illustrated in FIG. 6. an nth and/or a third rack 602 in the system no longer has enough good batteries 606 (e.g., sufficiently charged batteries) of the battery service module (BSM) 606 (shown as 606A-B in FIG. 6), which is indicated with an "X" labeled on the bad batteries of BSM 1, BSM 2, and BSM 3 in UPS 604A and BSM 2 of UPS 604B, to hold the system up for 240 seconds since the rack 602 has one DC UPS 604A fail and at least one battery (BSM 2) of the BSM 606A. Thus, the present invention provides a solution to prevent these scenarios by dynamically adjusting the power line disturbance hold up times in FIGS. 4-6 prior to the commencement of the power disturbance failover based on battery capacity of batteries in racks of the storage system as the batteries either fail, are repaired, and/or are added to the storage system having at least one uninterruptible power supply (UPS). Also, one or more various types of servers may be included in the rack may be included (see similar features in FIG. 4, by way of example only, with disk drive module "DDM" (e.g., hard drives) and/or coraid ethernet console (CEC) servers).

Figure 7:
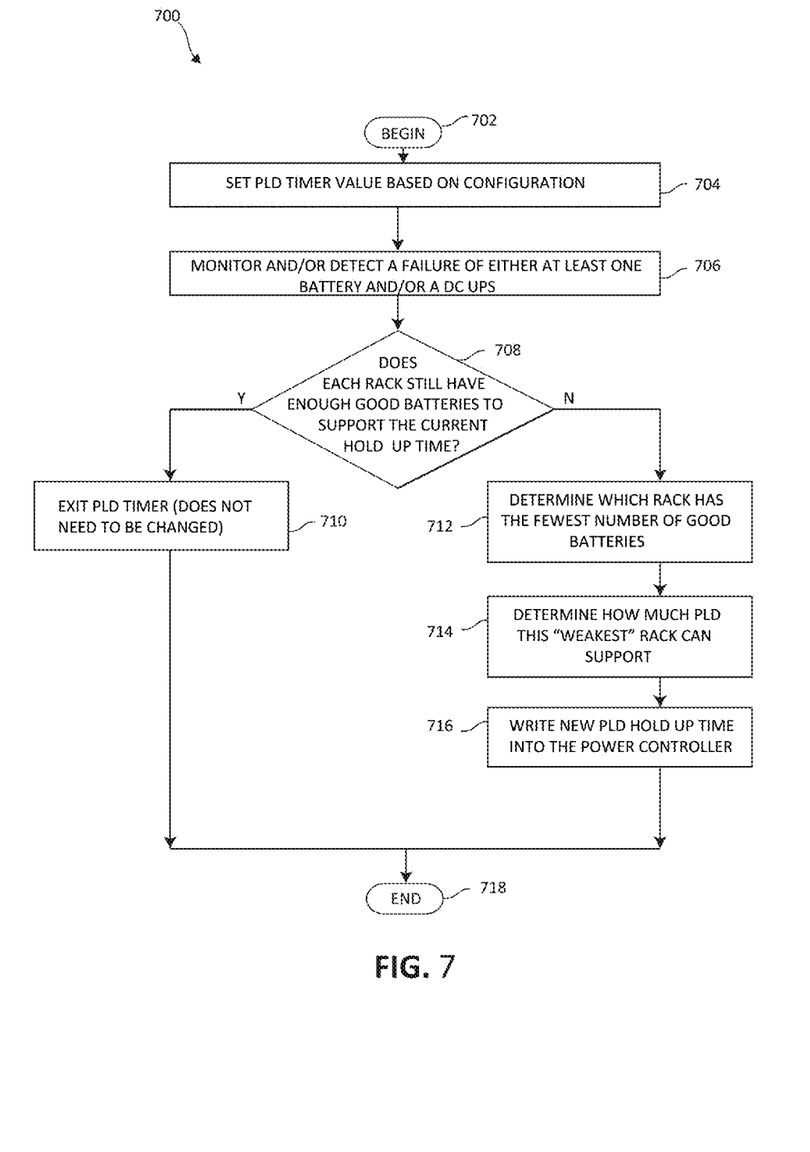
FIG. 7 is a flowchart illustrating an exemplary method for dynamically adjusting power line disturbance hold up times prior to the commencement of the power disturbance failover based on battery capacity of batteries in racks of the storage system in which aspects of the present invention may be realized.

As illustrated in FIG. 7, FIG. 7 describes how, as these power disturbance failures occur as depicted in FIGS. 5-6, the present invention dynamically changes the ePLD values when a UPS and/or at least one battery failure occurs. FIG.

7 is a flowchart illustrating an exemplary method 700 for dynamically adjusting power line disturbance hold up times prior to the commencement of the power disturbance failover based on battery capacity of batteries in racks of the storage system in which aspects of the present invention may be realized. The method 700 begins (step 702). The method 700 sets a power line disturbance (PLD) hold up timer value based on a configuration (step 704). The method 700 monitors and detects a failure of at least one battery and/or at least one uninterruptible power supply (UPS) (step 706). The method 700 determines if all of the racks in the storage system have enough good batteries (e.g., defining good batteries as batteries that have a sufficient charge) to support the current power line disturbance hold up time (step 708). If yes, the method 700 exits and the power line disturbance hold up (PLD) timer value is not changed (step 710). If no, the method 700 determines which of the racks has the fewest number of good batteries (step 712). The determined rack is considered the weakest rack. The method 700 determines how much power line disturbance this weakest rack can support (step 714). The method 700 writes a new power line disturbance hold up time into a power controller (step 716). The method 700 ends (step 718).

Thus, as described and using the failure examples above (see FIG. 5-6), to illustrate the present invention, the nth and/or third rack of the storage system may only support a 50 second power line disturbance so the hold up timer would dynamically be changed from 240 seconds to 50 seconds for the entire system. In this way, the system is guaranteeing that if a power outage occurs for less than 50 seconds the system will continue to ride through the power outage without shutting down. Also, the present invention ensures that if a power outage exceeds 50 seconds that the entire system starts the shutdown at 50 seconds (e.g., the weakest rack is required to start shutdown at 50 seconds) and all user data is able to be saved prior to any of the batteries running out of capacity to hold the system up.

Figure 8:
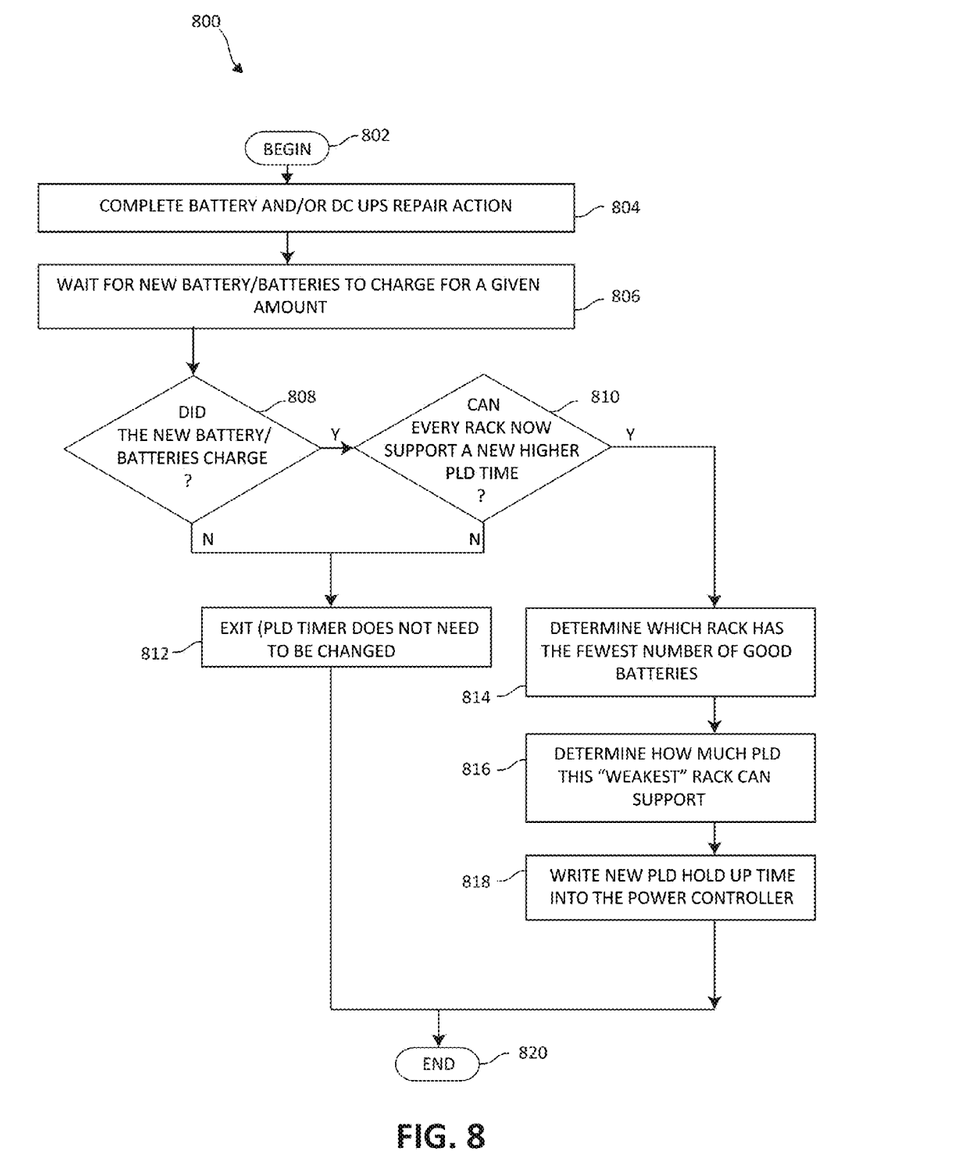
FIG. 8 is a flowchart illustrating an exemplary method for dynamically updating power line disturbance hold up times prior to the commencement of the power disturbance failover when a UPS or at least one BSM set is repaired and becomes available in racks of the storage system in which aspects of the present invention may be realized.

As illustrated in FIG. 8, the present invention describes how the power line disturbance hold up time is dynamically updated when a UPS and/or at least one BSM set is repaired and/or comes back available. FIG. 8 is a flowchart illustrating an exemplary method 800 for dynamically updating power line disturbance hold up times prior to the commencement of the power disturbance failover when a UPS or at least one BSM set (and/or at least one battery) is repaired and becomes available in racks of the storage system in which aspects of the present invention may be realized. The method 800 begins (step 802). The method 800 performs and completes at least one battery and/or at least one direct current (DC) uninterruptible power supply (UPS) repair action (step 804). The method 800 waits for at least one new battery to charge for a predetermined amount of time (step 806). The method 800 determines if at least one of the new batteries added is charged (step 808). If no, the method 800 exits and the power line disturbance hold up (PLD) timer value is not changed (step 812). If yes, the method 800 determines if every rack in the storage system is able to support an increased power line disturbance hold up time (step 810). If no, the method 800 exits and the power line disturbance hold up timer value is not changed (step 812). If yes, the method 800 determines which of the racks has the fewest number of good batteries (step 814). The determined rack with the fewest number of good batteries (e.g., charged batteries) is considered the weakest rack. The method 800 determines how much power line disturbance this weakest rack can support (step 816). The method 800 writes a new power line disturbance hold up time into a power controller (step 818). The method 800 ends (step 820).

Figure 9:
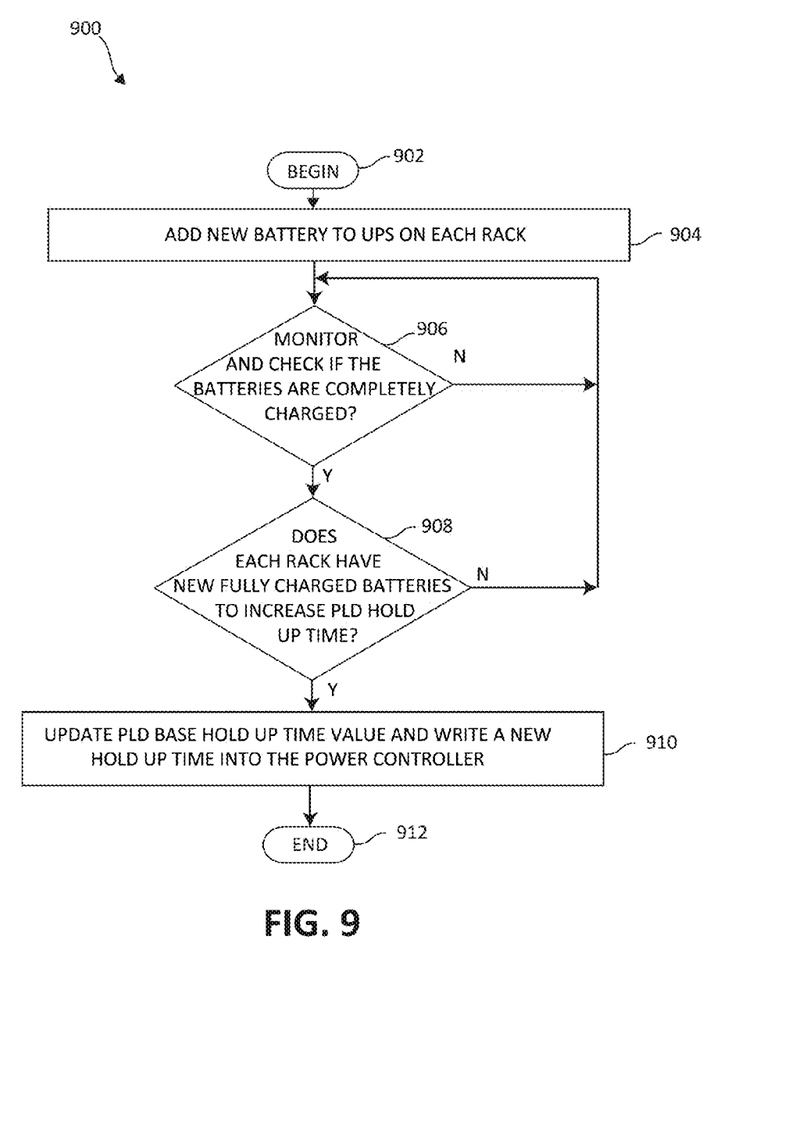
FIG. 9 is a flowchart illustrating an exemplary method for dynamically updating power line disturbance hold up times in which aspects of the present invention may be realized

As illustrated in FIG. 9, the present invention describes how storage system sets a new power line disturbance hold up time base configuration value and also dynamically updates when the new power line disturbance hold up time to a power controller when new batteries are installed onto at least one UPS and on each rack. FIG. 9 is a flowchart illustrating an exemplary method 900 for dynamically updating power line disturbance hold up times in which aspects of the present invention may be realized. The method 900 begins (step 902). The method 900 adds at least one new battery to at least one direct current (DC) uninterruptible power supply (UPS) on each rack of the storage system (step 904). The method 900 monitors and determines if the batteries are completely charged (step 906). If no, the method 900 returns and continues to monitor and determine if the batteries are completely charged (step 906). If yes, the method 900 determines if each rack has new and fully charged batteries to support an increase in the power line disturbance hold up time (step 908). If no, the method 900 returns and continues to monitor and determine if the batteries are completely charged (step 906). If yes, the method 900 updates the power line disturbance hold up time base configuration value to an increased power line disturbance hold up time and writes the new power line disturbance hold up time in the power controller (step 912).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for reducing power disturbance failover in a storage system having at least one uninterruptible power supply (UPS), by a processor device in a computing environment, comprising:
    dynamically adjusting power line disturbance hold up times based on battery capacity of a plurality of batteries in a plurality of racks by determining which one of the plurality of racks has a fewest number of remaining batteries of the plurality of batteries having the battery capacity; and
    determining an amount of the power line disturbance the one of the plurality of racks, having the fewest number of remaining batteries of the plurality of batteries with the battery capacity, is able to support.

2. The method of claim 1, further including performing one of:
    monitoring for a failure of one of the plurality of batteries,
    repairing one of the plurality of batteries, and
    adding at least one new battery to the plurality of batteries.

3. The method of claim 1, further including setting the power line disturbance hold up time based on a number of remaining batteries of the plurality of batteries with the battery capacity in a surviving one of the at least one UPS.

4. The method of claim 1, further including selecting the power line disturbance hold up time having a shortest hold up time in one of the plurality of racks.

5. The method of claim 1, further including writing a new power line disturbance hold up time into a power controller.

6. The method of claim 1, further including performing one of:
    performing a repair operation on one of a battery in the plurality of batteries and the UPS,
    waiting for at least one new battery of the plurality of batteries to charge for a predetermined time period,
    determining if the at least one new battery of the plurality of batteries charged,
    determining if the plurality of racks is able to support an increased power line disturbance hold up time, and
    updating the power line disturbance hold up time upon adding at least one new battery to the plurality of batteries.

7. A system for reducing power disturbance failover in a storage system of a computing environment, the system comprising:
    the storage system;
    a plurality of racks in the storage system;
    a plurality of batteries in the plurality of racks;
    at least one uninterruptible power supply (UPS) in the storage system in association with the plurality of batteries and the plurality of racks;
    a power controller in association with the at least one UPS; and
    at least one processor device operable in the computing environment, wherein the at least one processor device:
        dynamically adjusts power line disturbance hold up times based on battery capacity of a plurality of batteries in a plurality of racks by determining which one of the plurality of racks has a fewest number of remaining batteries of the plurality of batteries having the battery capacity; and
        determines an amount of the power line disturbance the one of the plurality of racks, having the fewest number of remaining batteries of the plurality of batteries with the battery capacity, is able to support.

8. The system of claim 7, wherein the at least one processor device performs one of:
monitoring for a failure of one of the plurality of batteries,
repairing one of the plurality of batteries, and
adding at least one new battery to the plurality of batteries.

9. The system of claim 7, wherein the at least one processor device sets the power line disturbance hold up time based on a number of remaining batteries of the plurality of batteries with the battery capacity in a surviving one of the at least one UPS.

10. The system of claim 7, wherein the at least one processor device selects the power line disturbance hold up time having a shortest hold up time in one of the plurality of racks.

11. The system of claim 7, wherein the at least one processor device writes a new power line disturbance hold up time into the power controller.

12. The system of claim 7, wherein the at least one processor device performs one of:
performing a repair operation on one of a battery in the plurality of batteries and the UPS,
waiting for at least one new battery of the plurality of batteries to charge for a predetermined time period,
determining if the at least one new battery of the plurality of batteries charged,
determining if the plurality of racks is able to support an increased power line disturbance hold up time, and
updates the power line disturbance hold up time upon adding at least one new battery to the plurality of batteries.

13. A computer program product for reducing power disturbance failover in a storage system having at least one uninterruptible power supply (UPS), by a processor device in a computing environment, the computer program product comprising a non-transitory computer-readable storage medium having computer-readable program code portions stored therein, the computer-readable program code portions comprising:
an executable portion that dynamically adjusts power line disturbance hold up times based on battery capacity of a plurality of batteries in a plurality of racks by determining which one of the plurality of racks has a fewest number of remaining batteries of the plurality of batteries having the battery capacity; and
an executable portion that determines an amount of the power line disturbance the one of the plurality of racks, having the fewest number of remaining batteries of the plurality of batteries with the battery capacity, is able to support.

14. The computer program product of claim 13, further including an executable portion that performs one of:
monitoring for a failure of one of the plurality of batteries,
repairing one of the plurality of batteries, and
adding at least one new battery to the plurality of batteries.

15. The computer program product of claim 13, further including an executable portion that performs one of:
setting the power line disturbance hold up time based on a number of remaining batteries of the plurality of batteries with the battery capacity in a surviving one of the at least one UPS, and
selecting the power line disturbance hold up time having a shortest hold up time in one of the plurality of racks.

16. The computer program product of claim 13, further including an executable portion that writes a new power line disturbance hold up time into the power controller.

17. The computer program product of claim 13, further including an executable portion that performs one of:
performing a repair operation on one of a battery in the plurality of batteries and the UPS,
waiting for at least one new battery of the plurality of batteries to charge for a predetermined time period,
determining if the at least one new battery of the plurality of batteries charged, and
determining if the plurality of racks is able to support an increased power line disturbance hold up time, and
updating the power line disturbance hold up time upon adding at least one new battery to the plurality of batteries.

* * * * *